Dec. 2, 1941.  C. B. EISENHAUER  2,264,627
METHOD OF FORMING CASINGS
Filed April 18, 1938  7 Sheets-Sheet 1
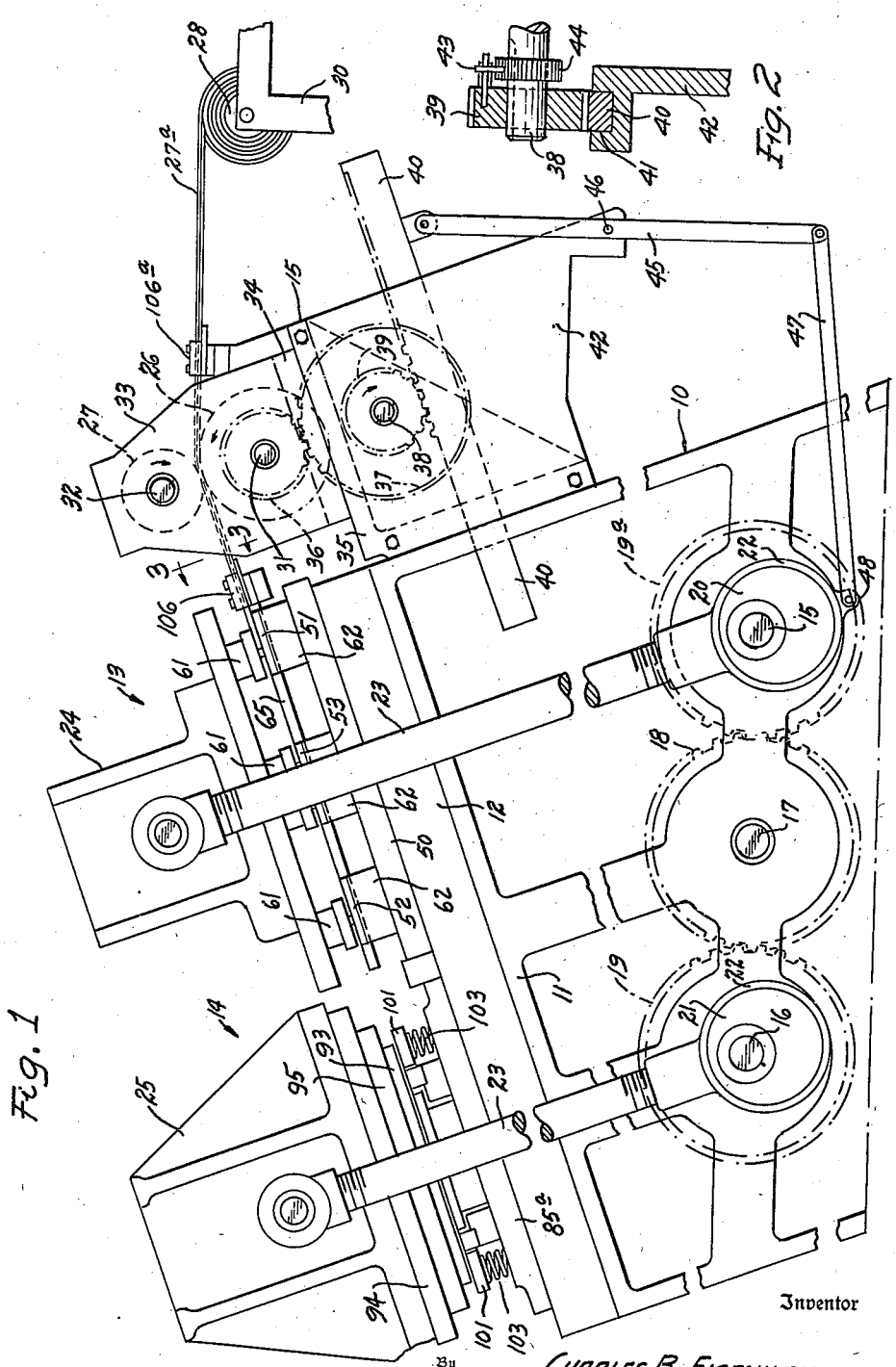
Inventor
CHARLES B. EISENHAUER.
By
Attorneys Dec. 2, 1941.  C. B. EISENHAUER  2,264,627
METHOD OF FORMING CASINGS
Filed April 18, 1938  7 Sheets-Sheet 2
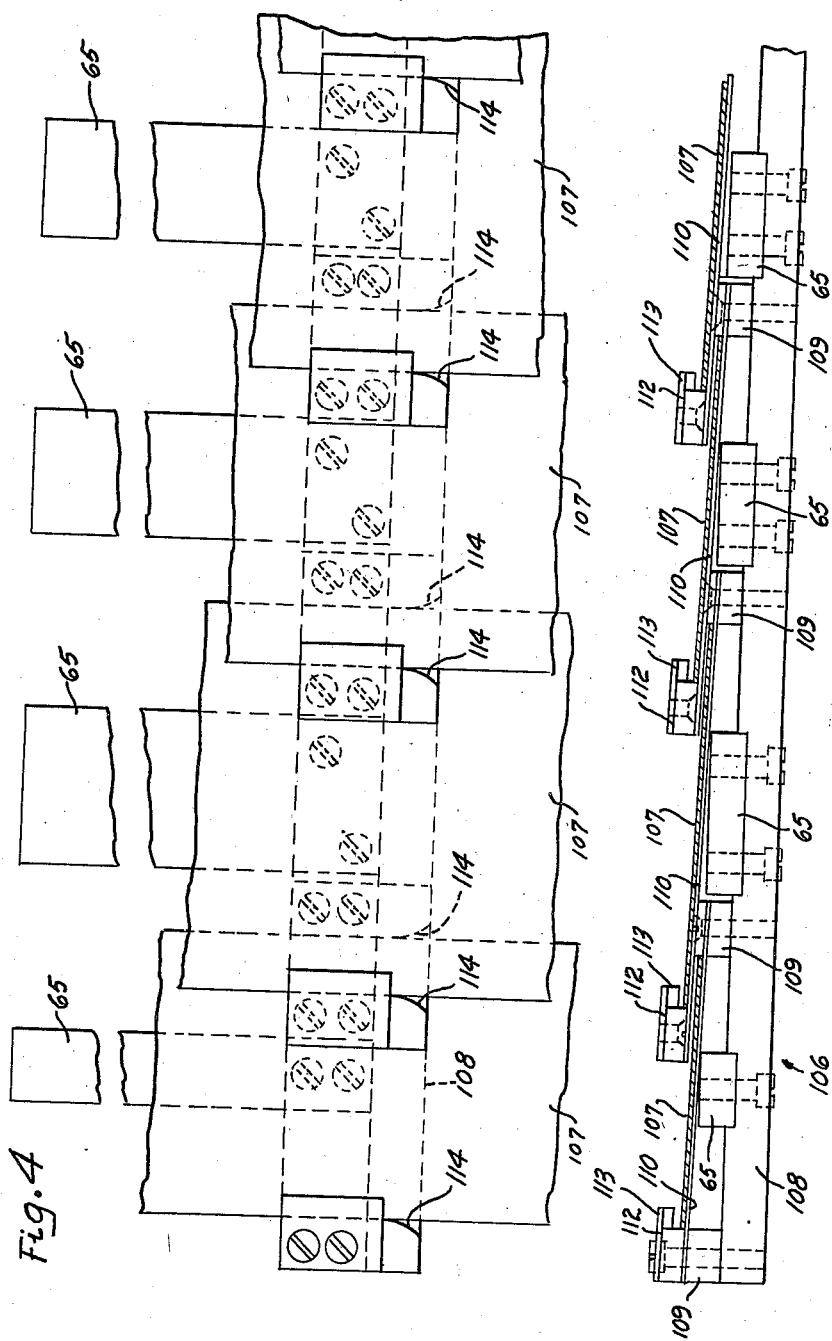
Inventor
CHARLES B. EISENHAUER.
By
Attorneys Dec. 2, 1941.  C. B. EISENHAUER  2,264,627
METHOD OF FORMING CASINGS
Filed April 18, 1938  7 Sheets-Sheet 3

Inventor
CHARLES B. EISENHAUER.
By
Attorneys

Dec. 2, 1941.  C. B. EISENHAUER  2,264,627
METHOD OF FORMING CASINGS
Filed April 18, 1938   7 Sheets-Sheet 4
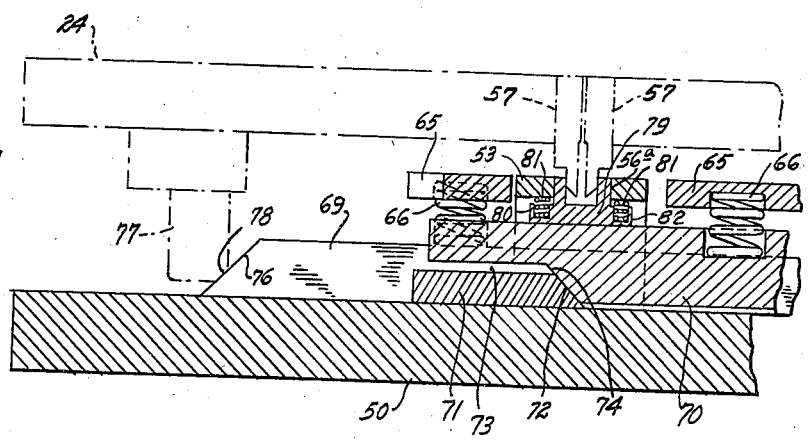
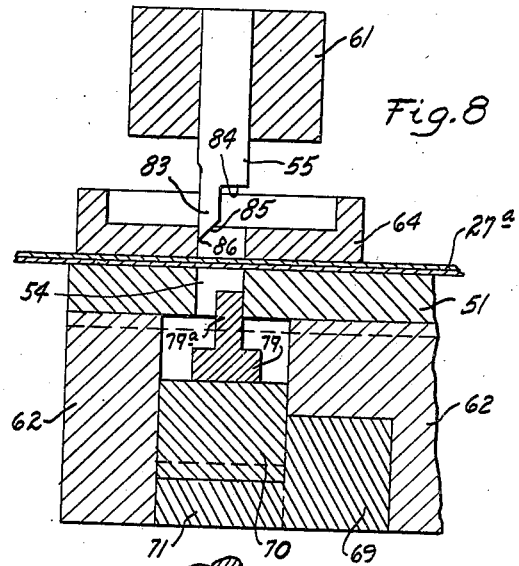
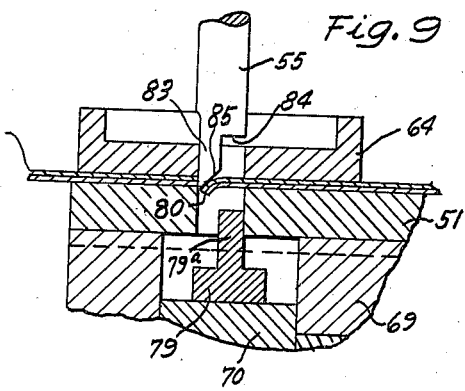
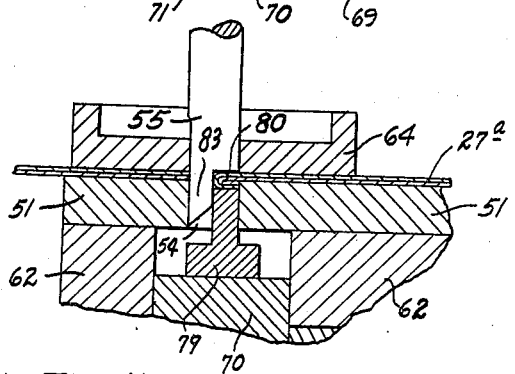
Inventor
CHARLES B. EISENHAUER.
By
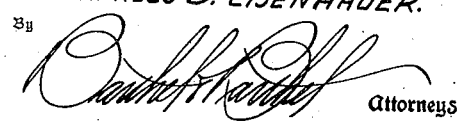
Attorneys Dec. 2, 1941.  C. B. EISENHAUER  2,264,627
METHOD OF FORMING CASINGS
Filed April 18, 1938  7 Sheets-Sheet 5
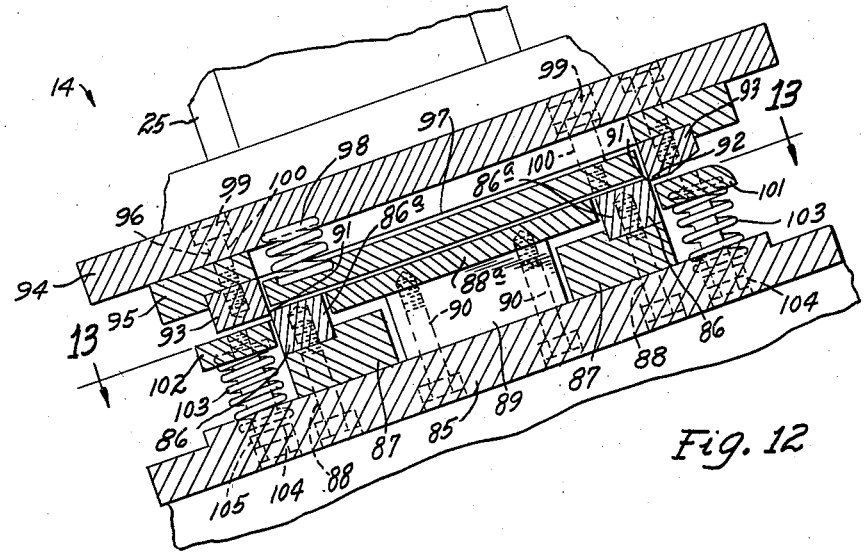
Fig. 12
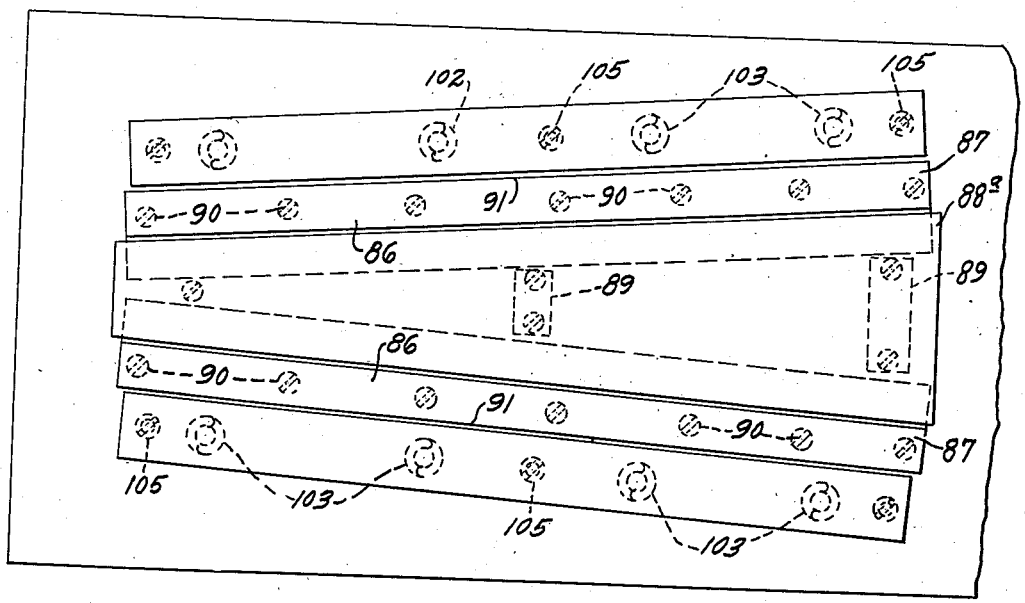
Fig. 13
Inventor
CHARLES B. EISENHAUER
By 
Attorneys Dec. 2, 1941.　　　C. B. EISENHAUER　　　2,264,627
METHOD OF FORMING CASINGS
Filed April 18, 1938　　　7 Sheets-Sheet 6

Inventor
CHARLES B. EISENHAUER
By
Attorneys

Dec. 2, 1941.  C. B. EISENHAUER  2,264,627
METHOD OF FORMING CASINGS
Filed April 18, 1938  7 Sheets-Sheet 7
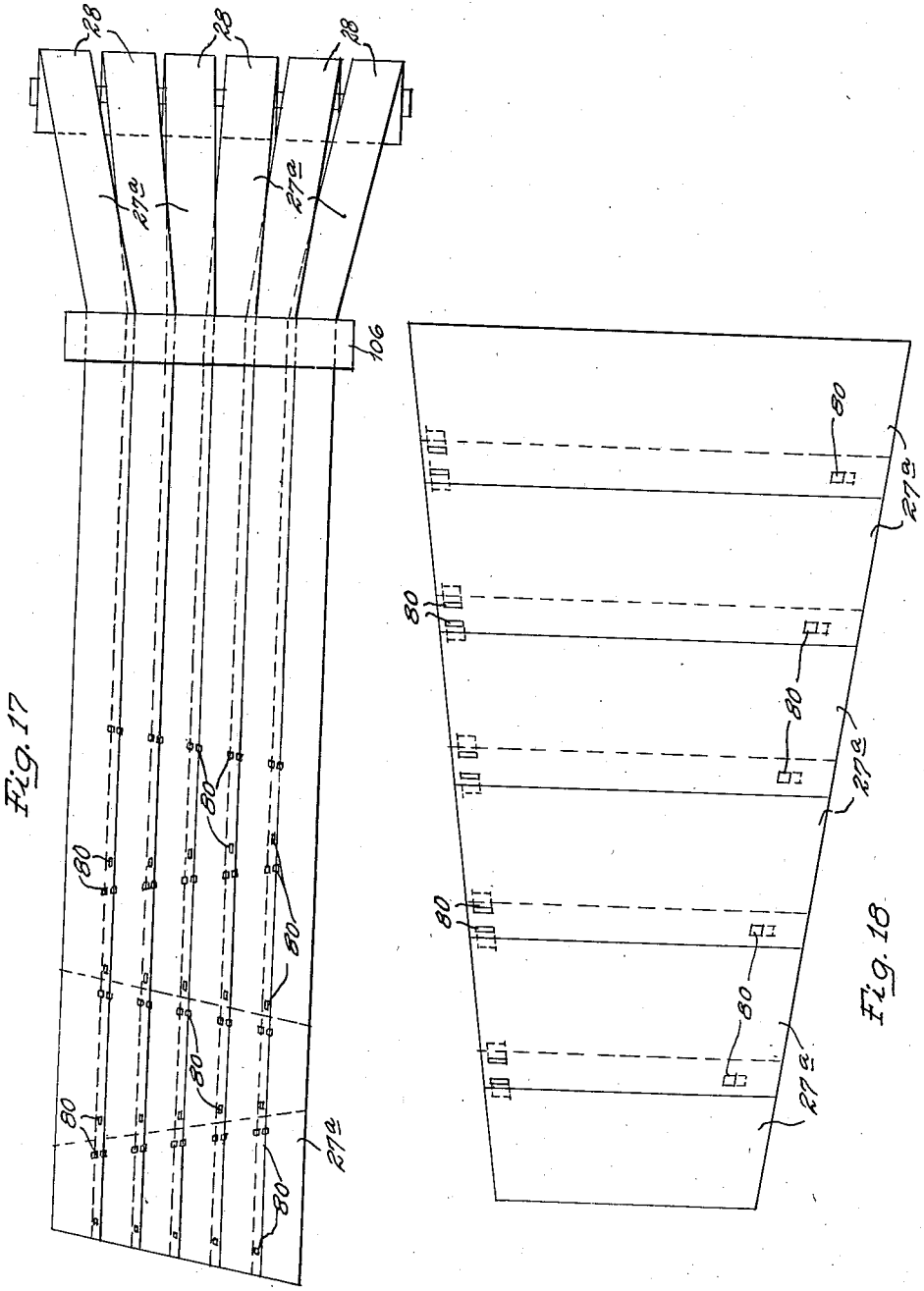
Inventor
CHARLES B. EISENHAUER.
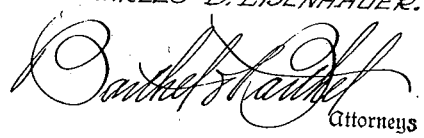
By
Attorneys Patented Dec. 2, 1941

2,264,627

UNITED STATES PATENT OFFICE 2,264,627

METHOD OF FORMING CASINGS

Charles B. Eisenhauer, Detroit, Mich., assignor by mesne assignments, to Reconstruction Finance Corporation, Detroit, Mich., a corporation of the United States Application April 18, 1938, Serial No. 202,625

5 Claims. (Cl. 113—116)

This invention relates generally to a method of and apparatus for manufacturing casings and more particularly to a method of and apparatus for manufacturing casings for leaf springs.

It is an object of the present invention to provide a new and improved method of and apparatus for manufacturing elongated longitudinally flexible leaf spring casings.

Another object of the invention is to provide a new and improved method of and apparatus for inexpensively manufacturing elongated sectionally constructed flexible spring casings.

Another object of the invention is to provide a new and improved method of and apparatus for manufacturing elongated sectionally constructed spring casings which may be formed as unitary structures so that they may be easily handled.

Other objects of the invention will be apparent from the following description taken in connection with the accompanying drawings which form a part of the specification and in which Figure 1 is a view shown in side elevation of an apparatus embodying my invention;

Fig. 2 is a view in cross section showing certain structural details of the present apparatus;

Fig. 3 is a front view shown in elevation taken along the line 3—3 of Fig. 1, of a plurality of guides or gauges employed in the apparatus;

Fig. 4 is a top plan view of the gauges shown in Fig. 3 and associated structure;

Fig. 7 is a view shown in cross section of the die taken along the line and in the direction of the arrows 7—7 of Fig. 6, showing the die in closed position;

Fig. 8 is a fragmentary view shown in cross section of the die taken along the line 8—8 of Fig. 6 and showing the upper die in raised position;

Figs. 9, 10 and 11 are fragmentary views shown in cross section of the die showing the upper die in different positions with respect to the work and to the lower die;

Fig. 12 is a view shown in cross section of a shearing die of the present apparatus;

Fig. 13 is a top plan view of the lower shearing die taken along the line 13—13 of Fig. 12;

Figure 17 is a diagrammatic view illustrating the present method of preparing a sectionally constructed blank from which a spring casing may be made; and Figure 18 is an enlarged view of one of the blanks.

Figures 5, 6:
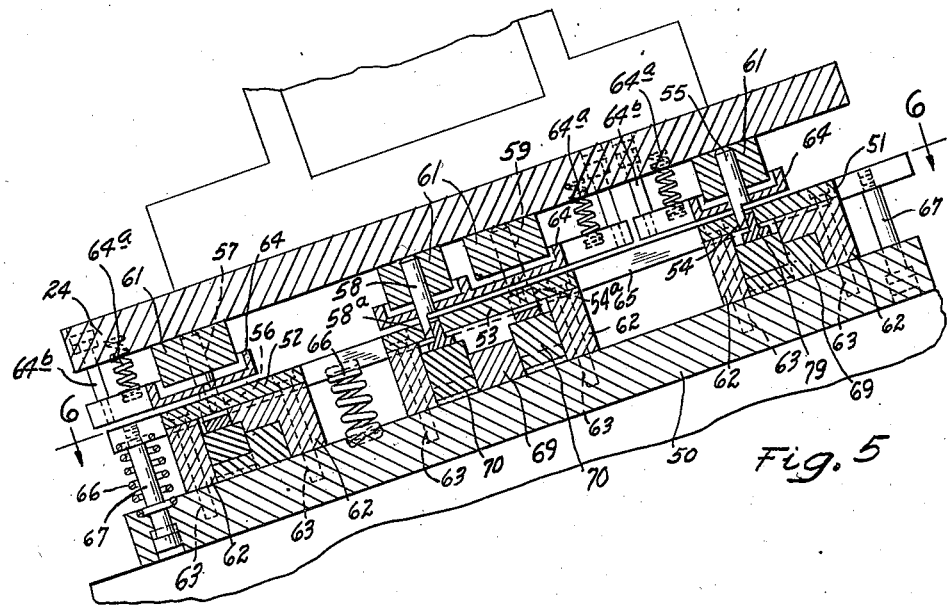
Fig. 5 is a view shown in cross section of a die of the present apparatus.
Fig. 6 is a top plan view of the lower die, taken along the line 6—6 of Fig. 5.

Referring to the drawings by characters of reference and first to Fig. 1, the present apparatus includes a power press having a frame 10 including an upper base 11 on which is supported a bed 12 which is preferably angularly disposed, sloping downwardly from front to rear of the apparatus. Mounted on the bed 12, adjacent the front thereof, is a die, designated in general by the numeral 13, which may be termed a stitching die and also mounted on the bed 12 rearwardly of and adjacent to the die 13 in a shearing die 14. The power press for operating the dies 13 and 14 may be of any suitable type and may include spaced driven shafts 15 and 16 intermediate of which there may be a drive shaft 17, these shafts extending transversely of the apparatus in relatively spaced parallel relation and may be journaled for rotation in suitable bearings in frame 10. Keyed to the drive shaft 17, a drive gear 18 meshes with and drives similar gears 19 and 19a keyed respectively, to the driven shafts 15 and 16 and the drive shaft 17 may be driven or rotated by any suitable source of power. Keyed respectively to the driven shafts 15 and 16 are eccentrics 20 and 21 which slidably rotate in bearings or straps 22, on the lower ends of connecting rods 23 which operatively connect the eccentrics to upper movable die heads 24 and 25 respectively of the dies 13 and 14.

Positioned at the front or in advance of the stitching die 13 is a pair of feed rollers 26 and 27 for feeding a plurality of continuous, substantialy parallel strips of metal 27a to the stitching die 13 which then attaches adjacent strips together along adjacent longitudinal edges thereof as will later be seen. Preferably the strip stock 27a is wound on spools 28, which may be rotatably supported by a frame 30. The feed rollers 26 and 27, of which the lower roller 26 is the drive roller, have shafts 31 and 32 respectively which are journaled in bearings in the upstanding sides 33 of a U-shaped support 34, supported and rigidly secured to an L-shaped bracket 35 which in turn is rigidly secured to the frame 10 of the power press. Keyed to the drive roller shaft 31, a gear 36 meshes with a gear 37 which is keyed to a shaft 38 on which a second gear 39 is provided and meshes with a reciprocal gear rack 40 which is reciprocated in accordance with operation of the dies to periodically drive the feed roller 26 in a direction to feed the strips 27a to the dies. The gear rack 40, Fig. 2, is slidably received and guided in a slideway 41 provided in a plate member 42 which may be rigidly secured to the L-shaped bracket 35 by any suitable means. The gear 39 is loosely mounted on the shaft 38 and carries a pawl 43 which cooperates with a ratchet 44 keyed to the shaft 38, to provide for intermittent rotation of the rollers 26 and 27 in one direction only. A lever 45 having one end pivoted to the gear rack 40 is pivoted intermediate its ends, as at 46, to the plate member 42 and at its other end is pivoted to one end of a connecting rod 47, the other end of which is pivoted to a lug 48 provided on the connecting rod strap 22 of the stitching die. It will be seen that on the upstroke of the press, the rack 40 will be moved toward the press, rotating the rollers 26 and 27 which will feed the metallic strips 27a to the dies and that on the down stroke of the press feeding of the strip stock will be stopped by reason of the pawl 43 and ratchet 44.

Figure 14:
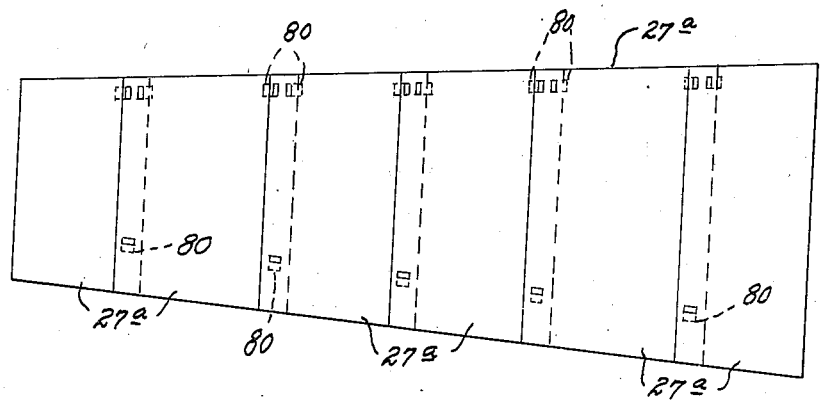
Fig. 14 is a plan view of a sectional constructed cover blank.

Referring now to the detail construction of the stitching die 13, Figs. 5 and 6, the lower part of this die includes a base plate 50 which may be rigidly secured to the bed 12 by any suitable means and mounted on the base 50 are transverse rows of raised die plates comprising a front row of die plates 51, a rear row of die plates 52 and an intermediate row of die plates 53, the plates of each row being relatively spaced transverse of the apparatus or transverse to the direction of feeding of the metallic strip stock 27a. The die plates 51, or first row of plates, are each provided with a punch receiving aperture 54 to receive a single punch 55, these apertures aligning transversely of the die base at an angle to the direction of feeding of the metallic strips 27a and the rear row of die plates 52 are provided with punch receiving apertures 56 to receive a double punch 57, which apertures are relatively aligned transversely of the die base in parallel relation with the aligned apertures of the first row of die plates. The intermediate row of die plates 53 are each provided with a pair of spaced, punch receiving apertures 54a and 56a, the apertures 54a to receive single die punches 55 and the apertures 56a to receive double die punches 57, Fig. 7. The die punches 55 and 57 are rigidly secured in blocks 61 which in turn are carried by and rigidly secured to the underside of the upper movable die head 24. The punch receiving apertures 54a and 56a of the intermediate die plates 53 respectively, align transversely of the strips 27a to be attached together and alignment thereof is at an acute angle to the alignment of the front and rear rows of punch receiving apertures, the present die in one operation stitching or attaching together strips for two sectional blanks which after shearing by the die 14 are trapezoidal in form as shown in Fig. 14.

The die plates 51, 52 and 53 are each mounted on a pair of spaced blocks 62 and may be rigidly secured thereto and to the base 50 by screws 63 or by other suitable means. A plurality of spaced, elongated movable stripper plates 64 having apertures to receive the die punches are provided and are spaced slightly and immediately above the die plates, the stripper plates 64 extending transversely of the strips 27a. Springs 64a urge the stripper plates 64 downwardly, such movement being limited by the heads of screws 64b which are screwthreaded into the upper die base 24. A plurality of lower vertically movable stripper plates 65 are provided and extend in relative spaced relation from front to rear of the base 50 between the raised die plates, the metallic strips 27a to be attached together being supported on the upper surfaces of the movable stripper plates 65 and on the upper surfaces of die plates 51, 52 and 53. Helical coil springs 66 urge the stripper plates 65 upwardly, upward movement of the stripper plates 65 being limited slightly above the die plates 51, 52, 53 by the heads of screws 67 which are screwthreaded into the stripper plates and have their heads movable in and adapted to engage the end walls of recesses in the fixed base 50.

A plurality of elongated longitudinally slidable cam members 69 extend one under each row of the die plates 62 and on movement raise and/or lower cam engaging or follower members 70. The cam members 69 have longitudinally spaced, laterally extending portions 71, Fig. 7, each provided with an inclined upwardly facing cam surface 72, which position in spaced cutouts 73, only one of which are shown in the cam follower members 70 which have downwardly facing inclined cam surfaces 74 for cooperative engagement with the inclined surface 72. Acting against one end of each of the elongated cam members 69 are helical coil springs 75, Fig. 6, which act to move the cam member 69 in a direction to permit the cam follower member 70 to descend, the cam engaging member 70 being limited in such movement by stop members 75a rigidly secured to the base 50. Each of the slidably movable cam members 69 is provided at the end thereof opposite its respective spring 75 with an upwardly facing inclined portion 76 and the upper punch carrying plate carries depending members 77 provided on their lower ends with inclined surfaces 78 adapted to engage the inclined surfaces 76 to move the cam members 69 longitudinally against the action of the springs 75 to raise the cam follower members 70. Loosely supported on the upper surface of the cam follower members 70, a plurality of abutment members 79 have upwardly extending portions 79a which project into and are retained in the punch receiving apertures in the die plates 51, 52 and 53, the upper ends of these portions 79a, on upward movement of the cam follower members 70 engaging the tabs 80 which are punched out by the die punches and crimping or bending the tabs over thereby to attach the several strips 27a of strip stock together. Helical coil springs 81, compressed between the underside of the die plates 51, 52 and 53 and flanges 82 of the abutment members 70, act to urge the abutment members downwardly maintaining them in engagement with the upper surface of the cam follower members 70. The punches as shown in Figs. 7 to 10 inclusive have a depending punch portion 83 offset from the upwardly extending abutment portions 79 and have a downwardly facing abutment surface 84 overlying and cooperable with the upper ends of the abutment members 79 to bend over the tabs 80, the lower end of the punch having a downwardly facing inclined surface 85 terminating in a lower pointed end 86 for piercing the metal strips. It will be seen that the inclined surfaces 85 on the punches causes the tabs 80, formed out of metal strips, to curl back and under the metal in position to be crimped or flattened by the abutment members 79 on closing of the die.

Referring now to the shearing die 14 and more particularly to Figs. 12 and 13, this die includes a fixed base 85a rigidly secured to the frame 10 and mounted on the base 85a is a pair of elongated lower shearing die members 86a which are angularly disposed in relative tapered relation. These die members 86a are mounted on and rigidly secured to spacers 87 and to the die base 85a by screws 88. Positioned between the spaced die members 86a, a filler plate 88a has its upper surface flush with the upper surface of the die members and seats on spacers 89, the filler plate and spacers being rigidly secured together and to the die base 85a by screws 90. The upper, outer, longitudinal edges 91 of the die members 86 are cutting edges which cooperate with lower inner cutting edges 92 of die members 93 carried by the movable die head 25, the upper cutting edges 92 being positioned outwardly of the lower cutting edges 91. The upper die members 93 are of elongated form and are spaced from the upper die base 94 by spacers 95, the parts being rigidly secured together by screws 96. Positioned above the lower die members 87 and carried by the upper die base 94 is a stripper plate 97 which is urged downwardly by helical coil springs 98, downward movement being limited by the heads 99 of screws 100. Outwardly of the lower shearing dies 87, front and rear stripper plates 101 and 102 respectively are provided and are urged upwardly by helical coil springs 103 which seat in recesses in the base 85, upward movement of the stripper plates being limited by the heads 104 of screws 105 which are screwthreaded into the stripper plates and have their heads 104 movable in recesses in the lower die base 85.

Mounted on and rigidly secured to the forward ends of the stitching die lower stripper plates 65, Figs. 1 and 6, is a unitary structure 106 comprising a plurality of gauges or guides for guiding the several strips of stock 27a so that they will be fed to the dies with their adjacent longitudinal edges in overlapping relation along which overlapped edges the strips 27a are pierced and attached together at spaced intervals by the stitching die 13. The guide structure 106, Figs. 3 and 4, includes a base 108 secured to the underside of the movable stripper plates 65 transversely thereto on which is mounted and rigidly secured thereto a plurality of transversely spaced blocks 109. Angularly disposed supporting plates 110 are each secured at their opposite ends to a pair of the blocks 109 and extend in relative spaced relation, successive plates being in relative overlapping relation. Mounted on and secured to the supporting plates 110 are spaced guide members 112 which co-operate with the blocks 109 to guide the metallic strips 107, the guide members 112 preferably having extended portions 113 overhanging the strips 107. The guide member 112 and the cooperating guide blocks 109 preferably have rounded formed ends, as at 114 to aid in starting the strip stock in the guideways. A second guide structure 106a which may be of the same construction as the guide structure 106 is preferably provided in advance of the rollers 26, 27 for aiding in guiding the continuous metallic strips so that they will be presented to the dies with their adjacent longitudinal edges in overlapping relation.

Figure 15:
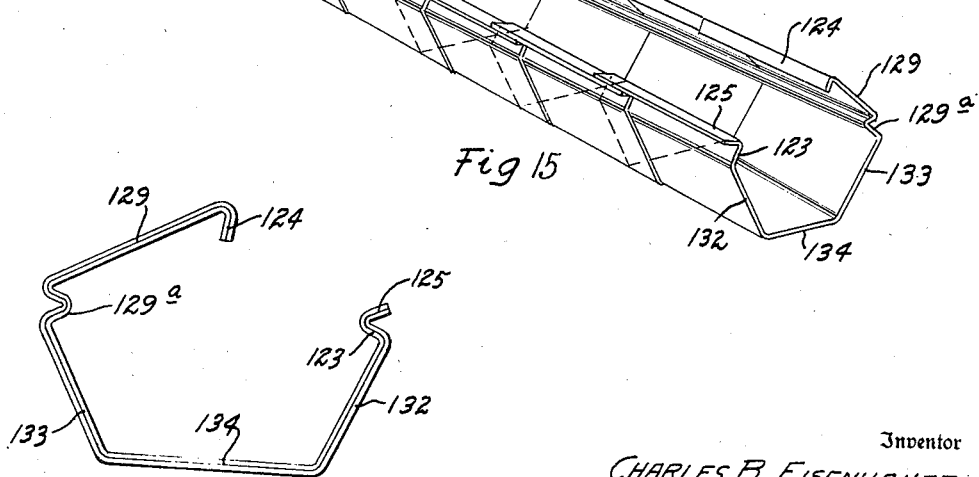
Fig. 15 is a perspective view of the finished spring casing.

After the metallic strips 27a have been attached together longitudinally thereof by the stitching die 13, the shearing die 14 shears the continuous strips transversely thereof into sectionally constructed blanks 27a, Fig. 14, which then may be easily handled in the operation of forming them into leaf spring casings one of which is shown in Fig. 15.

Figure 16:
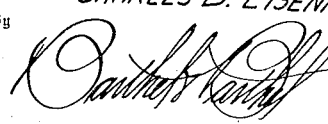
Figure 16 is a view of one end of a finished spring casing.

The operation of the herein described apparatus is as follows: On raising or opening movement of the dies 13 and 14, the rack 40 which is operatively connected to the connecting rod strap 22 by link 41 and lever 45 is moved forward and through gears 39, 36 and 37 drives the rollers 26, 27 which feed the continuous strips 27a to the dies 13 and 14, the strips 27a first passing through the guide structures 106a and 106 which position and retain adjacent strips with their adjacent longitudinal edges in relative overlapping relation. On downward movement of the upper dies the rack 40 is moved in the opposite direction but by reason of the pawl 43 and ratchet 44, Fig. 2, the rollers 26 and 27 are not rotated and feeding of the strips is discontinued during this movement of the rack 40 to permit the dies 13 and 14 to stitch and shear respectively the strips then in the dies. On descent of the punches, Figs. 9, 10 and 11, the pointed ends thereof pierce the overlapped border portions of adjacent strips 107 and as the punches continue to descend the beveled surfaces 85 thereof cause the double thickness of metal or tabs to curl under the strips immediately above the upper ends of the upwardly movable abutment member 79. Also as the punches descend, the movable stripper plates 65 are moved downwardly against the action of the springs 66 and the depending abutment members 77 carried by the upper die base engage the inclined cam surfaces 76 of the longitudinally movable cam members 69 which move the cam follower members upward against the action of the springs 75 raising the abutment members 79 upward to flatten the tabs 80 between the upper ends of the abutment members and the downwardly facing abutment surfaces 34 of the punches 55, 57. On upward movement of the upper die or punches, the cam members 69 are released and are returned by the springs 75 which permits the cam follower members 70 and the abutment members 79 which are loosely supported on the upper horizontal cam surfaces to descend, downward movement of the abutment members 79 being aided by the springs 81. It will be understood that the present stitching die 13 in one operation of the die attaches strips together for two blanks each blank having along one longitudinal edge thereof spaced single tabs punched out and turned over and along and adjacent the other edge thereof a row of spaced pair of tabs, although any suitable number of tabs and arrangement thereof may be had, as desired. On raising or opening of the stitching die 13 the lower stripper plates 65 are moved upward by the springs 66 to move the strips 27a slightly upward to push the tabs 80 out of the punch receiving apertures in the dies plates 51, 52 and 53. Simultaneously with the stitching operation the shearing die 14 on each operation thereof shears the strips 27a transversely thereof and shears off two sectionally constructed blanks which are in the shape of a trapezoid, each blank comprising a plurality of attached together pieces of the strips 27a as shown in Fig. 14. Preferably the press for operating the stitching and shearing dies is of the type which is automatically and periodically tripped. After the blanks are sheared off from the strips they may be formed by suitable dies into spring casings of the character shown in Figures 15 and 16. In the first forming operation the blank is bent along one longitudinal edge thereof providing the outturned flange 123 having the offset portion 125 bent back upon itself and in the second operation, the blank is bent along the other longitudinal edge thereof providing the flange 124. In the third forming operation the blank is bent along a line spaced inwardly of the flange 123 providing the top casing wall 129 and a crimped offset portion 129a which offset portion 129a provides for taking up slack in fitting the casing over a leaf spring. In the final operation, the blank is bent along two lines longitudinally of the blank providing the bottom and side walls 132 and 133 respectively, of the finished casing. The flanges 124, 125 are adapted for interlocking relation to close the casing after it is positioned or fitted over a leaf spring.

By the present method of preparing blanks wherein a plurality of metallic strips are automatically fed, attached together and then sheared into sectionally constructed blanks, these blanks may be easily and conveniently handled to form an elongated longitudinally flexible leaf spring casing. Moreover longitudinal flexible spring casings are not only easily and efficiently manufactured from the blanks made by the herein disclosed method but are strong and durable and may be inexpensively manufactured.

What I claim is:

1. The method of preparing sectionally constructed blanks for manufacturing flexible casings for leaf springs which comprises, attaching together side-by-side a plurality of continuous strips of relatively great lengths in proportion to their widths along adjacent longitudinal edges thereof at predetermined longitudinally spaced locations therealong, said strips being free from such attachment between said locations, whereby to permit relative motion therebetween in response to the flexing of the spring, and then shearing the strips transversely thereof into blanks each comprising a plurality of attached together pieces of the strips.

2. The method of preparing sectionally constructed blanks for manufacturing flexible casings which comprises, feeding a plurality of juxtapositioned continuous strips of relatively great lengths in proportion to their widths in side-by-side substantially parallel relation, attaching adjacent strips together at predetermined longitudinally spaced locations therealong, said strips being free from such attachment between said locations, whereby to permit relative motion therebetween in response to the flexing of the spring, and then shearing the strips transversely thereof into sectionally constructed blanks comprising attached together pieces of the strips.

3. The method of preparing blanks for manufacturing sectionally constructed flexible covers for leaf springs which comprises, feeding a plurality of metallic strips of relatively great lengths in proportion to their widths in side-by-side longitudinal relation, guiding the strips so that adjacent longitudinal border portions thereof are in relative overlapping relation, attaching the strips together at and along the overlapping portions thereof at predetermined longitudinally spaced locations therealong, said strips being free from such attachment between said locations, whereby to permit relative motion therebetween in response to the flexing of the spring, and then shearing the strips transversely thereof into blanks each comprising a plurality of attached together pieces of the strips.

4. The method of preparing sectionally constructed blanks for manufacturing elongated longitudinally flexible covers for leaf springs which comprises, intermittently feeding continuous metallic strips in relative longitudinal relation, guiding the strips so that adjacent edges of adjacent strips are in relative overlapping relation as the strips are fed, attaching the overlapping portions together at spaced intervals therealong by mutually forming out and bending over tabs from the overlapped portions, and then simultaneously shearing the strips transversely thereof into trapezoidal blanks comprising attached together pieces of the strips.

5. The method of preparing sectionally constructed blanks for manufacturing elongated longitudinally flexible covers for leaf springs which method comprises, feeding continuous narrow strips of relatively great lengths in proportion to their widths in side-by-side longitudinal relation, guiding the strips so that adjacent longitudinal border portions thereof are in relatively overlapping relation as the strips are fed, attaching the overlapping border portions together at predetermined longitudinally spaced locations therealong, said overlapping border portions being free from such attachment between said locations whereby to permit relative motion therebetween in response to the flexing of the spring, and then shearing the strips transversely thereof into blanks comprising attached together pieces of the strips.

CHARLES B. EISENHAUER.